(12) United States Patent  (10) Patent No.: US 6,547,862 B2
Dean  (45) Date of Patent: Apr. 15, 2003

(54) ROTARY PHASE SEPARATOR WITH INTEGRAL ACCUMULATOR AND OUTLET VALVE

(75) Inventor: W. Clark Dean, Simsbury, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 09/897,211

(22) Filed: Jul. 2, 2001

(65) Prior Publication Data

US 2003/0000184 A1 Jan. 2, 2003

(51) Int. Cl.[7] .......................... B01D 19/00; B01D 45/14
(52) U.S. Cl. .............................. 96/174; 96/215; 96/216; 96/421; 55/403; 55/409; 55/417
(58) Field of Search ..................... 55/401, 403, 406, 55/408, 409, 417; 96/417, 421, 215, 216, 217, 174

(56) References Cited

U.S. PATENT DOCUMENTS 5,244,479 A * 9/1993 Dean et al. .................... 55/409

5,693,125 A 12/1997 Dean

* cited by examiner

Primary Examiner—Robert A. Hopkins
(74) Attorney, Agent, or Firm—Carlson, Gaskey & Olds

(57) ABSTRACT

A rotary phase separator includes an accumulator and a liquid outlet valve to separate the phases of a liquid/gas mixture. The separator includes a housing defining a radial accumulator chamber and supporting a shaft, and a motor to drive the shaft for rotation about a longitudinal axis. A plurality of disks and cylinders are attached to the shaft to create frictional contact with the mixture to drive the liquid outward against an inner wall of the separator, thereby displacing the gas to a central region about the shaft. A liquid outlet on the inner wall includes a valve seal held closed by a control springs until a predetermined differential pressure is reached. The gas exits through an opening in the hollow shaft to a gas outlet tube. A valve member actuated by a solenoid seals the gas outlet tube until sufficient gas has accumulated to allow separation.

20 Claims, 3 Drawing Sheets

ROTARY PHASE SEPARATOR WITH INTEGRAL ACCUMULATOR AND OUTLET VALVE

BACKGROUND OF THE INVENTION

This invention relates to a rotary phase separator for separating liquid from gas in a zero or variable gravity environment.

Typically, the separation of gas from a liquid is accomplished by allowing entrapped gas to bubble upward out of the liquid under the influence of gravity. This method does not work in zero or variable gravity environment encountered by space vehicles. Typically, in such environments, a liquid/gas circulation system is used that includes a circulating pump; an accumulator to accommodate volume changes in the liquid/gas mixture and a separator to separate the liquid phase from the gas phase. Such systems are utilized to generate oxygen by electrolysis of water.

Current state of the art systems utilize bellows accumulators to accommodate volume changes due to variation in the amount of oxygen being delivered and a special membrane separator to remove generated gas from the liquid stream. When used in a zero gravity environment, a bellows accumulator can become gas bound, leading to reduced liquid capacity in the accumulator. The membrane separator must be replaced often because the membrane becomes contaminated.

To eliminate the need for a membrane separator, a rotary phase separator that uses centrifugal force to separate the liquid phase from the gas phase can be utilized. However, a typical rotary phase separator requires a liquid control system that vents accumulated gas as necessary to maintain a relatively constant liquid level. Further, in such systems it is of critical importance that the separated phases not be mixed upon exit of the separator such as may occur on start up before sufficient rotational speed has been attained to sufficiently separate the phases of the mixture.

For this reason it is desirable to develop a system that does not become contaminated during use, which does not require periodic replacement and which can accommodate liquid level fluctuations, thereby acting as an accumulator.

SUMMARY OF THE INVENTION

The invention is a rotary phase separator assembly including an accumulator and a liquid outlet valve for use in a closed loop recirculating system to separate the phases of a liquid/gas mixture at varying liquid levels.

The rotary phase separator has a separating chamber capable of accommodating different liquid levels and thereby acts as an accumulator for a closed loop gas/liquid-recirculating system. The rotary phase separator assembly includes an accumulator/separator chamber defined by an inlet housing and an outlet housing. The accumulator/separator chamber is cylindrically shaped about a longitudinal axis. An inlet port for the liquid/gas mixture opens tangentially into the accumulator/separator chamber such that incoming flow of the mixture initiates a spinning motion. The inlet port opens into a pre-swirl chamber that begins the separation of the liquid from the gas.

The liquid and gas continue to rotate about the axis and are driven by a plurality of disks and cylinders attached to a hollow shaft driven by a motor. Hydrodynamic bearings are provided to support the shaft such that the shaft will rotate on a cushion of liquid drawn from the accumulator/ separator chamber. The hydrodynamic bearings substantially eliminate any mechanical friction to increase the reliability and life of the entire assembly. The disks and cylinders are in frictional contact with the liquid/gas mixture to create a centrifugal force that throws the liquid toward the outer diameter of the accumulator chamber. As the liquid is thrown to the outside of the accumulator chamber, the gas is displaced and migrates toward the axis about the hollow shaft.

The disks include a plurality of holes disposed near the axis to allow gas to flow through the disks along the shaft to an opening within the shaft leading to the hollow portion of the shaft. Gas within the hollow section of the shaft exits through a non-rotating gas outlet tube to a gas outlet port. The gas outlet tube includes a valve member actuated by a solenoid to seal the gas outlet tube shut when the shaft is not rotating and until sufficient gas has accumulated within the accumulator/separator chamber to facilitate phase separation.

The valve is required to prevent liquid from exiting through the gas outlet port. The inner walls of the hollow section of the shaft are tapered toward the opening in the shaft. With the shaft spinning, centrifugal force drives any liquid trapped within the hollow section along the tapered walls of the shaft and through to the opening to reenter the accumulator/separator chamber.

Liquid rotating along the outer diameter of the accumulator/separator chamber exits through a liquid outlet valve. The liquid outlet valve includes a valve seal biased closed against inner and outer seats by a plurality of control springs equally positioned about the outer diameter of the accumulator/separator chamber. The control springs exert sufficient load on the valve seal to remain closed until a predetermined pressure differential is reached between liquid in the liquid outlet and liquid in the accumulator/ separator chamber. Control of the liquid outlet is required to prevent gas from exiting along with the liquid through the liquid outlet during system start up.

The subject invention includes an accumulator chamber to accommodate varying levels of liquid such that a separate liquid control system is not required, and gas and liquid outlet control valves that remain closed until the rotary phase separator attains optimal separation conditions to prevent mixing of phases between the liquid and gas outlet ports.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
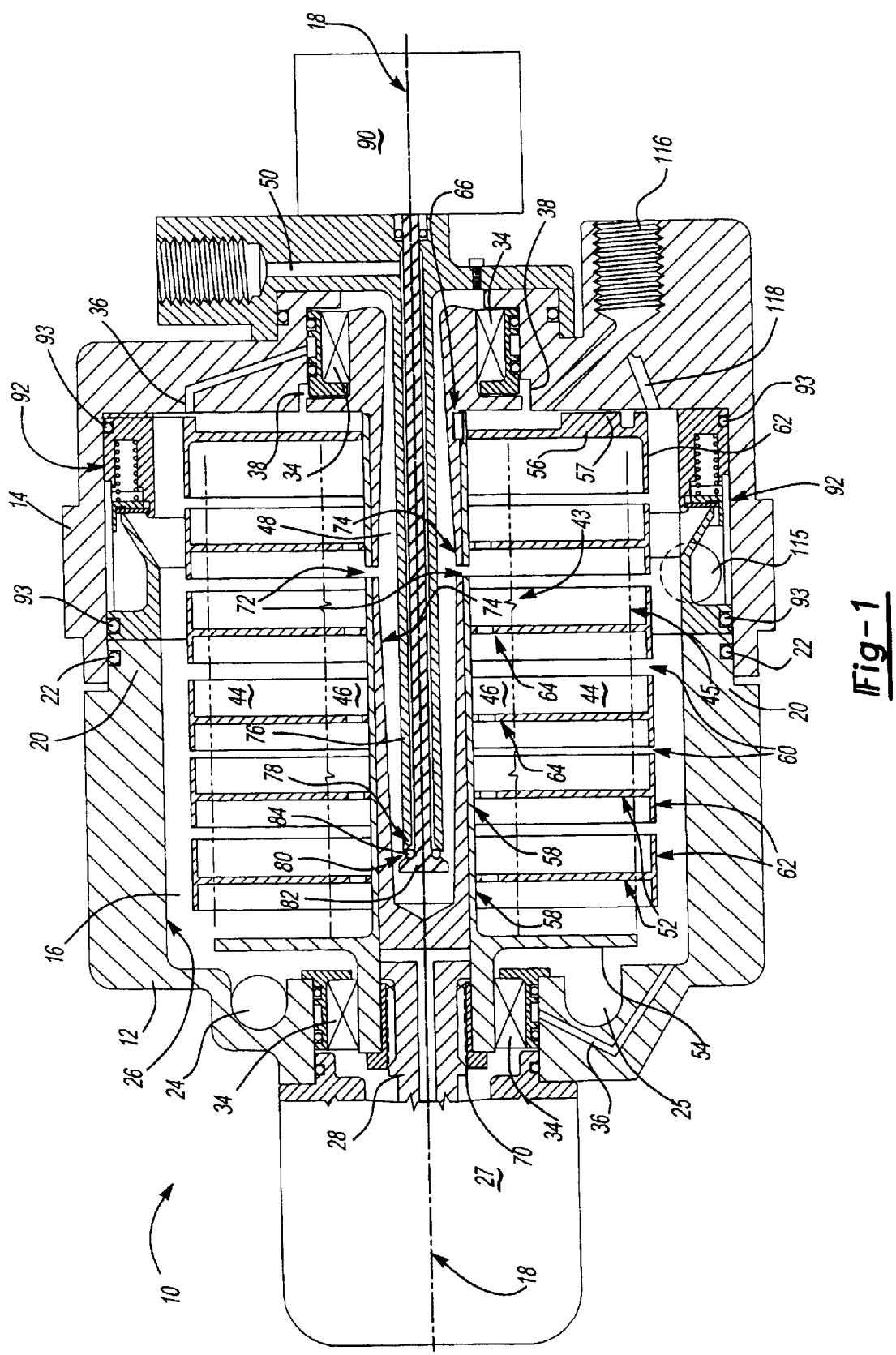
FIG. 1 is a cross sectional view of the rotary phase separator.

Referring to the Figures, wherein like numerals indicate like or corresponding parts throughout the several views, the subject invention is a rotary phase separator assembly for separating a liquid from a gas contained in a liquid/gas mixture and is generally shown at 10 in FIG. 1. The rotary phase separator separates phases of the liquid/gas mixture by using a motor 27 to drive a shaft 28 having a plurality of disks 52 and cylinders 62 that contact the liquid/gas mixture to spin the liquid such that centrifugal force drives the liquid toward an outer diameter 26 thereby creating a liquid ring 44 that displaces gas. The gas then migrates toward the center to create a gas core 46. The liquid and gas are then exhausted from the chamber through separate outlet ports.

The rotary phase separator 10 includes an inlet housing 12 and an outlet housing 14 connected to one another to form an inner accumulator/separator chamber 16. The accumulator/separator chamber 16 is cylindrical with the outer diameter 26 concentric about a longitudinal axis 18. Preferably the inlet housing 12 includes extended sections 20 that are attached to the outlet housing 14. The connection of the outlet housing 14 to the inlet housing 12 may be accomplished by any means known by a worker skilled in the art. A seal 22 seals the connection point between the housings 12,14. The inlet housing 12 includes an inlet opening 24, best shown in FIG. 3, tangential to the outer diameter of the pre-swirl chamber 25.

A motor 27 mounted to the inlet housing 12 drives a shaft 28 about the longitudinal axis 18. Preferably the motor 27 is a canned electric motor. A canned electric motor is only one possible means of rotating the shaft 28. It is within the contemplation of this invention that any motor known by a worker skilled in the art can be used to drive the shaft 28. Further the shaft may be driven by alternate methods, such as being driven off of a hydraulic pump or other adjacent apparatus.

Bearing assemblies 34 disposed within the inlet and outlet housings 12,14 support the shaft 28 for rotation about the longitudinal axis 18. Preferably, the bearing assemblies 34 are hydrodynamic bearings. Hydrodynamic bearing assemblies are known in the art and support the shaft 28 for rotation on a cushion of liquid. Rotating the shaft 28 on a cushion of liquid substantially eliminates mechanical contact such that friction is substantially reduced. The use of hydrodynamic bearings substantially increases the operational life of the rotary phase separator assembly 10. The inlet and outlet housings 12,14 include liquid inlet passages 36 and liquid exhaust passages 38 to provide liquid flow to the hydrodynamic bearings. The bearing assembly 34 disposed in the inlet housing 12 is a radial bearing to support rotation of the shaft 28. The bearing assembly 34 disposed in the outlet housing 14 includes a radial and a thrust bearing such that the end of the shaft 28 is supported for rotation and restrained from movement along the longitudinal axis 18.

The shaft 28 includes a hollow section 48 in communication with a gas outlet 50. The plurality of disks 52 are secured to the shaft 28 and extends radially toward the outer diameter 26 of the accumulator/separator chamber 16. Each disk 52 includes a hub portion 58 that is secured to the shaft 28. Preferably a last disk 56 is secured to the shaft by a keyway connection 66 on the shaft 28. Each succeeding disk 52 slides over the shaft and engages the proceeding disk such that all the disks are locked with one another to rotate with the shaft 28. A nut 70 threads onto the shaft and tightens down against the disk hub portions 58 to secure the disk 52 to the shaft 28. This is only one means of securing the disks 52 to the shaft 28 and any means known by a worker skilled in the art is within the contemplation of this invention.

Preferably there are seven disks 52 and each disk includes a plurality of openings 64 disposed near the hub portion 58. The openings 64 provide the flow of gas through the disks 52. The disks 52 also include a cylindrical section 62 that extends perpendicularly about a circumference of the disks 52. In the preferred embodiment a last disk 56 includes a cylindrical section 62 and a first disk 54 nearest the inlet opening 24 does not include the cylindrical section 62. The first disk 54 does not include a cylindrical section 62 to allow the incoming liquid/gas mixture to freely flow into the accumulator/separator chamber 16 thereby reducing or eliminating any possible back pressure through the inlet opening 24.

The last disk 56 includes a series of vanes 57 disposed radially on a side of the disk 56 facing the outlet housing 14. The vanes 57 extend from the disk 56 to within close proximity of the inside of the housing 14. The inclusion of a vane 57 on the last disk 56 is necessary to prevent liquid from accumulating about the shaft 28 and migrating into the gas outlet 50.

The disks 52 and cylinders 62 rotate and are in frictional contact with the liquid ring 44. The frictional contact between the liquid ring 44 and the disks 52 and cylinders 62 maintains rotation of the liquid and creates a centrifugal force that drives the liquid ring 44 toward the outer diameter 26 of the accumulator/separator chamber. A gap 60 disposed between cylinders 62 allows liquid to move toward the outer diameter 26 of the accumulator/separator chamber 16 and allows gas to move radially inward toward the longitudinal axis 18.

The hollow section 48 of the shaft 28 includes openings 72 that open to the accumulator/separator chamber 16. The hollow section 48 includes and inner walls 74 that taper toward the openings 72 such that liquid trapped within the hollow section 48 of the shaft 28 is driven toward the openings by centrifugal force created by rotation of the shaft 28 and exits through the openings 72 into the accumulator/separator chamber 16.

Preferably, a gas outlet tube 76 extends within the hollow section 48 of the shaft 28 from the gas outlet 50. The gas outlet tube 76 includes an opening 80 at a distal end 78 and a valve member 82 actuated by a solenoid 90 to close the opening 80 of the gas outlet tube 76. A seal 84 disposed on the valve member 82 seals against the opening 80. The solenoid 90 may be of any type known by a worker knowledgeable in the art. When the valve member 82 is open, gas enters the gas outlet tube 76 and exits the gas outlet 50.

Figure 2:
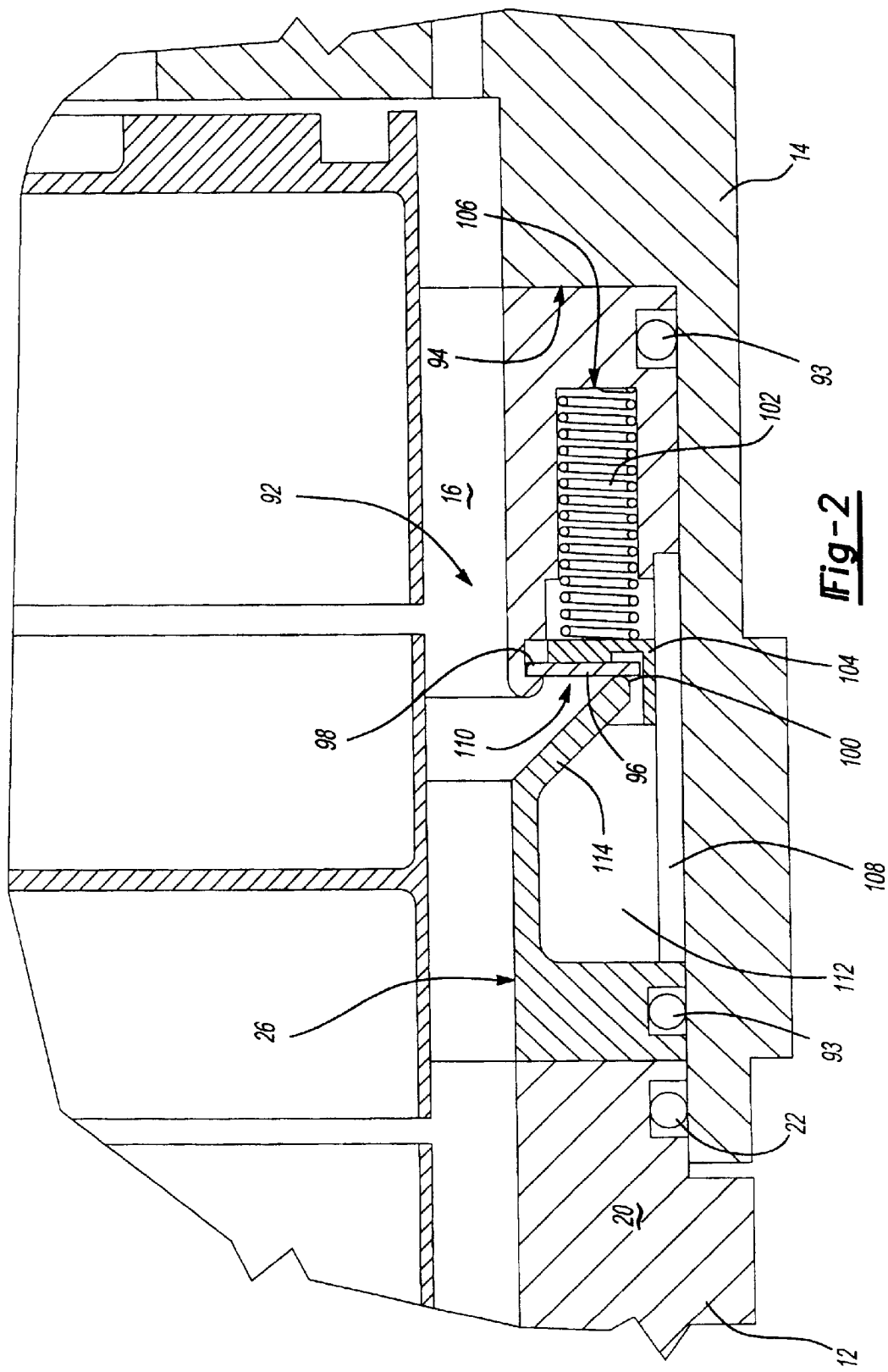
FIG. 2 is a cross sectional view of the liquid outlet valve.

Referring to FIG. 2, a liquid outlet valve 92 is disposed within a cavity 94 of the outlet housing 14 and extends annularly about the accumulator/separator chamber 16. Seals 93 seal between the liquid outlet valve 92 and the outlet housing 14. The liquid outlet valve 92 includes an inner and outer seat 98,100 that define an opening 110 perpendicular to the longitudinal axis 18. The outer seat 100 is disposed on a member 114 that extends angularly outward from the outer diameter 26 of the accumulator/separator chamber 16. A washer shaped elastomeric valve seal 96 seals against the inner and outer seats 98,100 and is biased toward a closed position by plurality of control springs 102. Preferably, the valve seal 96 is formed from an elastomeric material, however it is within the contemplation of this invention to use any material known to a worker skilled in the art. A poppet 104 is disposed between the valve seal 96 and the control spring 102 to guide movement of the valve seal 96. Each control spring 102 is set within a spring pocket 106. An outlet sleeve 108 maintains spacing between the inner and outer seats 98,100 such that the inner and outer seats 98,100 remain coplanar. A de-swirl chamber 112 is disposed adjacent the opening 110. Liquid passing between the upper and lower seats 98,100 flows through a substantially perpendicular bend into the de-swirl chamber 112 that acts to settle the turbulent effects of liquid rotating in the accumulator/separator chamber 16.

The control springs 102 are of a predetermined load such that the valve seal 96 remains closed until a predetermined difference in pressure between liquid in the de-swirl chamber 112 and the accumulator/separator chamber 16 is reached. Such a pressure differential occurs when liquid is being drawn from the assembly 10 such as by a pump (not shown). Liquid within the de-swirl chamber 112 exits through an outlet port 115. The outlet port 115, best shown in FIG. 3, is disposed tangential to the accumulator/separator chamber 16.

Referring back to FIG. 1, the quantity of liquid in the accumulator/separator chamber 16 is determined by measuring the difference in pressure between the liquid ring 44 and the gas core 46. To measure this difference the outlet housing includes a gas pressure tap 116 disposed near the center of the accumulator/separator chamber 16 and the longitudinal axis 18 and a liquid pressure tap 118 disposed near the outer diameter 26 of the accumulator/separator chamber 16. The dashed lines 43 and 45 indicate a maximum and minimum inner diameter of the liquid ring 44. The amount of liquid within the accumulator/separator chamber 16 can vary between a maximum where the liquid ring 44 has an inner diameter indicated by dashed line 43 that is disposed just above the openings 64 through the disks 52. A minimum amount of liquid is indicated by dashed line 45 where the inner diameter of the liquid ring 44 extends just to the inside of the cylinders 62. The effective volume of the liquid within the accumulator/separator chamber 16 is measured between the first disk 54 and the last disk 56 and varies depending on the inner diameter 43, 45 of the liquid ring 44.

Figure 3:
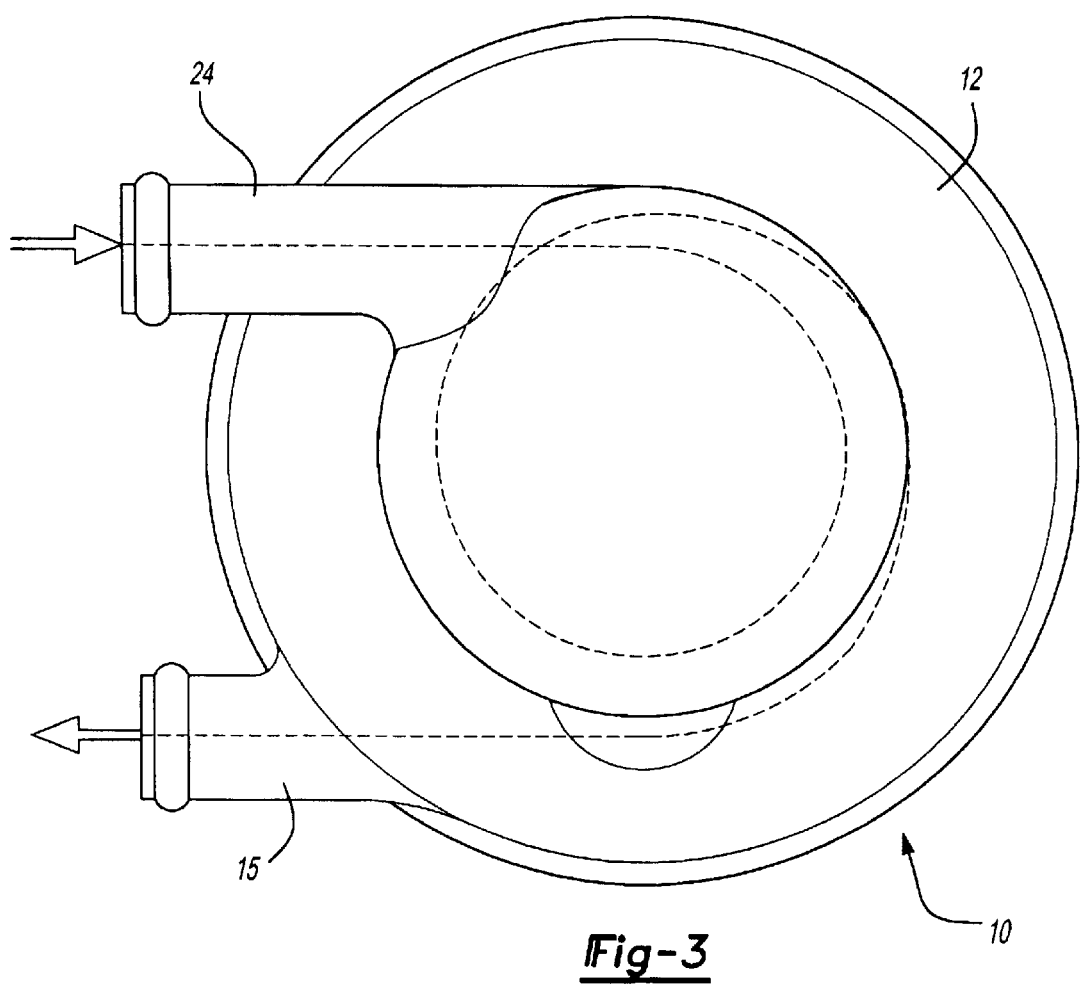
FIG. 3 is a plan view of the rotary phase separator.

In operation, the liquid/gas mixture enters the accumulator/separator chamber 16 through the inlet opening 24 in a tangential manner, best shown in FIG. 3, much like directing flow from a house around the inner walls of a bucket. The liquid initially enters the pre-swirl chamber 25 adjacent the accumulator/separator chamber 16. Initial separation of the liquid from the gas begins within the pre-swirl chamber 25. The preliminary separation of the liquid and the gas occurs with the heavier liquid thrown outward toward the outer diameter 26 of the accumulator/separator chamber 16 and the lighter gas being displaced by the liquid and migrating toward the center about the longitudinal axis 18. The partially separated liquid/gas mixture then enters the accumulator/separator chamber 16 past the first disk 54. The first disk 54 does not include a cylinder section 62 in order to substantially reduce backpressure into the inlet opening 24.

The motor 27 rotates the shaft 28 and thereby the disks 52 in a direction common to the incoming flow of liquid/gas mixture. As the liquid/gas mixture flows around the first disk 54, the gas is displaced by the liquid and thereby moves toward the longitudinal axis 18 to form the gas core 46. The liquid moves toward the outer diameter 26 of the accumulator/separator chamber 16 to form the liquid ring 44. The rotation of the disks 52 and cylinders 62 maintains the incoming rotation of the liquid portion of the mixture along the outer diameter 26 of the accumulator/separator chamber 16. Rotation of the disks 52 and cylinders 62 generates a centrifugal force that drives the liquid toward the outer diameter 26 of the accumulator/separator chamber away from the longitudinal axis 18. The gas core 46 forms because the heavier liquid displaces the lighter gas to form the gas core 46 within the liquid ring 44.

Gas flows through the openings 64 in the disks 52 toward the openings 72 to the hollow section 48 of the shaft 28. Within the hollow section 48 of the shaft 28 is the non-rotating gas outlet tube 76 that exhausts gas to the gas outlet 50. The opening 80 of the gas outlet tube 76 remains closed until sufficient gas accumulates in the gas core 44 to assure effective separation of liquid and gas. Once sufficient gas has accumulated the solenoid 90 actuates the valve member 82 to open the gas outlet tube 76. Actuation of the solenoid 90 may be by any means known by a worker knowledgeable in the art.

Liquid from the liquid ring exits the accumulator/separator chamber 16 through the liquid outlet valve 92. Referring to FIG. 2, the liquid outlet valve 92 remains closed until the predetermined pressure differential between liquid in the de-swirl chamber 112 and liquid in the accumulator/separator chamber 16 is attained. There is no external control of opening the liquid outlet 92. The predetermined pressure differential is dependent on the load selected for the control springs 102. A worker skilled in the art would understand that the load selected for the control springs 102 could be changed to satisfy application specific requirements.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A rotary liquid/gas separator assembly for separating liquid and gas in a liquid/gas mixture, said rotary liquid/gas separator assembly comprising;

a housing defining an accumulator/separator chamber having an outer diameter such that said liquid can fluctuate between first and second levels, a liquid/gas inlet in said housing, a shaft supported for rotation about a longitudinal axis within said accumulator/separator chamber and having a hollow section in communication with a gas outlet, a drive to rotate said shaft, a plurality of disks attached to rotate with said shaft, said disks in frictional contact with said liquid such that rotation of said disks creates centrifugal force driving said liquid toward said outer diameter of said accumulator/separator chamber, a liquid outlet disposed within said housing, said liquid outlet including a valve that opens in response to a predetermined pressure differential between liquid in said outlet and liquid in said accumulator/separator chamber.

2. The assembly of claim 1, wherein said liquid/gas inlet is disposed tangential to said accumulator/separator chamber and said inlet opens into a pre-swirl chamber to begin separating said liquid/gas mixture.

3. The assembly of claim 1, wherein said shaft is supported on hydrodynamic bearings at opposite ends within said housing such that said shaft rotates on a cushion of liquid, and said housing includes liquid passages to supply liquid to said hydrodynamic bearings, and to exhaust liquid from said hydrodynamic bearings.

4. The assembly of claim 1, wherein said hollow section of said shaft includes an opening to said accumulator/separator chamber and inner sides that taper toward said opening such that liquid within said hollow section of said shaft moves toward said opening and exits through said opening into said accumulator/separator chamber.

5. The assembly of claim 1, wherein a gas outlet tube extends within said hollow section of said shaft, said gas outlet tube includes an opening at a distal end and a valve member actuated by a solenoid to close said distal opening of said gas outlet tube.

6. The assembly of claim 1, wherein at least one of said plurality of disks includes a cylinder attached about a circumference of each of said plurality of disks.

7. The assembly of claim 6, wherein said cylinder is substantially perpendicular to said disks.

8. The assembly of claim 7, further including a gap disposed between said cylinders attached to separate disks.

9. The assembly of claim 7, wherein one of said plurality of disks closest to said inlet does not include said cylinder.

10. The assembly of claim 1, wherein each of said plurality of disks includes a plurality of openings disposed near said shaft such that said liquid/gas mixture flows between disks.

11. The assembly of claim 1, wherein said liquid outlet extends annularly about said outer diameter of said accumulator/separator chamber.

12. The assembly of claim 11, wherein said liquid outlet further includes a washer shaped valve seal that seals against an upper seat and a lower seat, said valve seal held against said upper and lower seats by a plurality of control springs equally spaced about said longitudinal axis within said outer diameter of said accumulator/separator chamber.

13. The assembly of claim 12, wherein said control springs include a predetermined load such that said valve seal opens at said predetermined pressure differential.

14. The assembly of claim 12, wherein said upper and lower seats define said liquid opening perpendicular to said axis.

15. The assembly of claim 12, further including a de-swirl chamber positioned adjacent said liquid opening.

16. The assembly of claim 15, wherein said de-swirl chamber is in liquid communication with an outlet port and said outlet port is disposed tangentially to said accumulator/separator chamber.

17. The assembly of claim 1, wherein said drive is a canned electric motor.

18. The assembly of claim 1, further including a gas pressure tap disposed within said housing to measure gas pressure present about said longitudinal axis and a liquid pressure tap disposed within said housing to measure liquid pressure near said outer diameter of said accumulator/separator chamber.

19. A rotary liquid/gas separator assembly for separating liquid and gas in a liquid/gas mixture, said rotary liquid/gas separator assembly comprising;

a housing defining an accumulator/separator chamber having an outer diameter such that said liquid can fluctuate between first and second levels, a liquid/gas inlet in said housing, a shaft supported for rotation about a longitudinal axis within said accumulator/separator chamber and having a hollow section in communication with a gas outlet, a gas control valve disposed within said hollow section of said shaft to control flow of gas out of said accumulator/separator chamber, a drive to rotate said shaft, a plurality of disks and cylinders attached to rotate with said shaft, said disks and cylinders are in frictional contact with said liquid such that rotation of said disks creates centrifugal force driving said liquid toward said outer diameter of said accumulator/separator chamber, a liquid outlet disposed within said housing and including a valve that opens in response to a predetermined pressure differential between liquid in said outlet and liquid in said accumulator/separator chamber.

20. The assembly of claim 19, wherein said gas control valve includes a gas outlet tube having an opening at a distal end and a valve member actuated by a solenoid to close said distal opening of said gas outlet tube.

* * * * *